United States Patent [19]
Rouverol

[11] 3,881,364
[45] May 6, 1975

[54] LOW NOISE GEARING
[76] Inventor: William S. Rouverol, 52 Lovell Ave., Mill Valley, Calif. 94941
[22] Filed: Mar. 22, 1974
[21] Appl. No.: 453,564

[52] U.S. Cl. .................................................. 74/462
[51] Int. Cl. ............................................ F16h 55/06
[58] Field of Search ..................................... 74/462

[56] References Cited
UNITED STATES PATENTS
3,824,873  7/1974  Rouverol .............................. 74/462

Primary Examiner—Leonard H. Gerin

[57] ABSTRACT

A system of gearing that reduces noise to the lowest possible level without sacrifice of torque capacity. This is accomplished by utilizing circular arc profiles of specified radius such that the tooth root bending stresses never exceed the surface stresses no matter how fine the teeth are. The exceptionally large number of contact points resulting from the use of such fine teeth reduces the noise level to the minimum.

26 Claims, 9 Drawing Figures

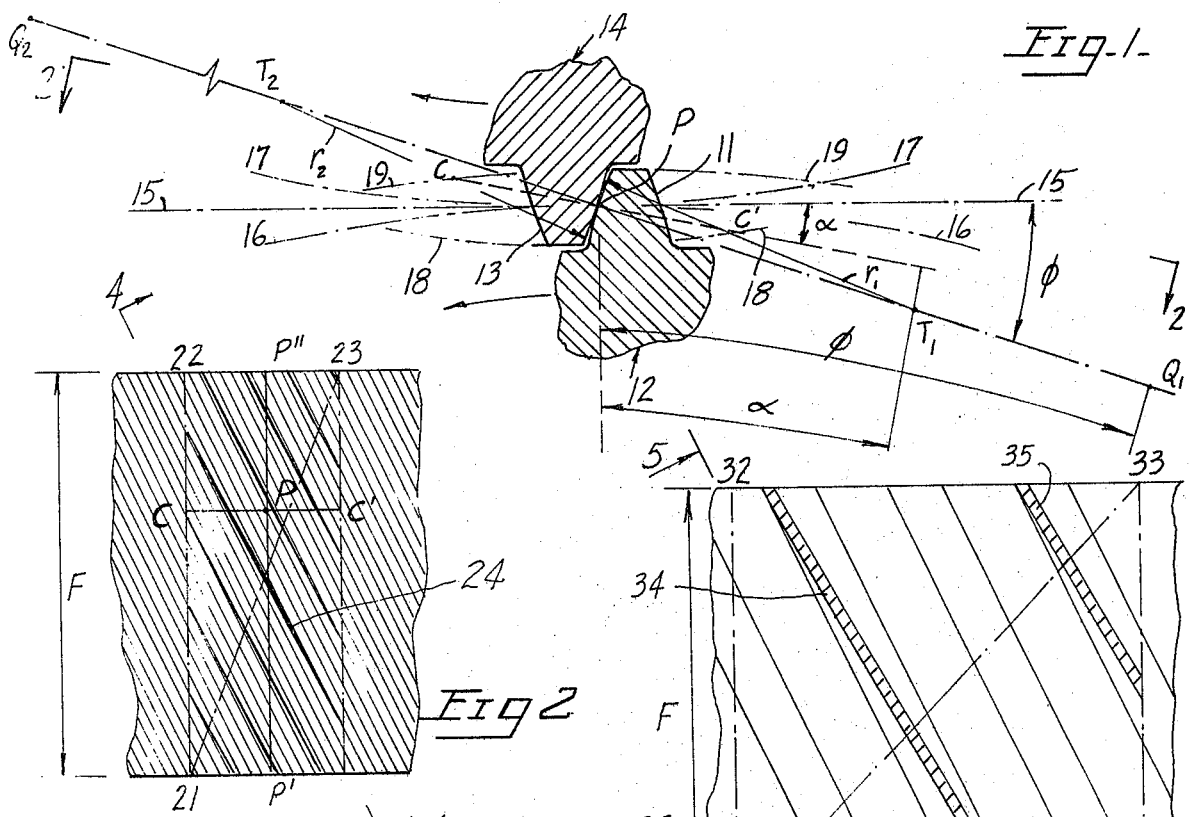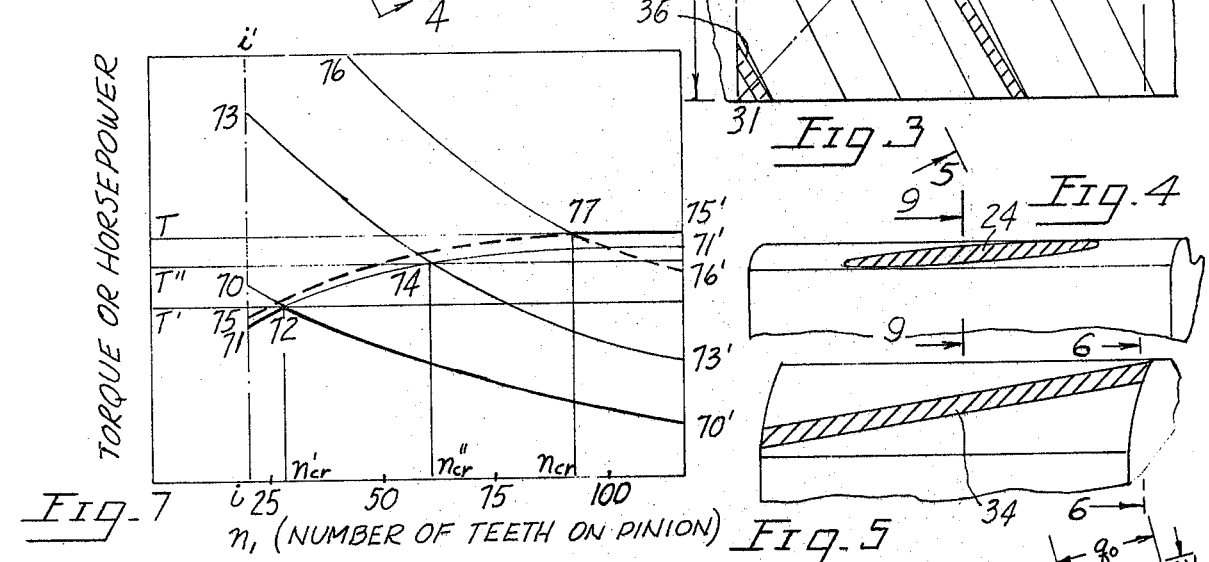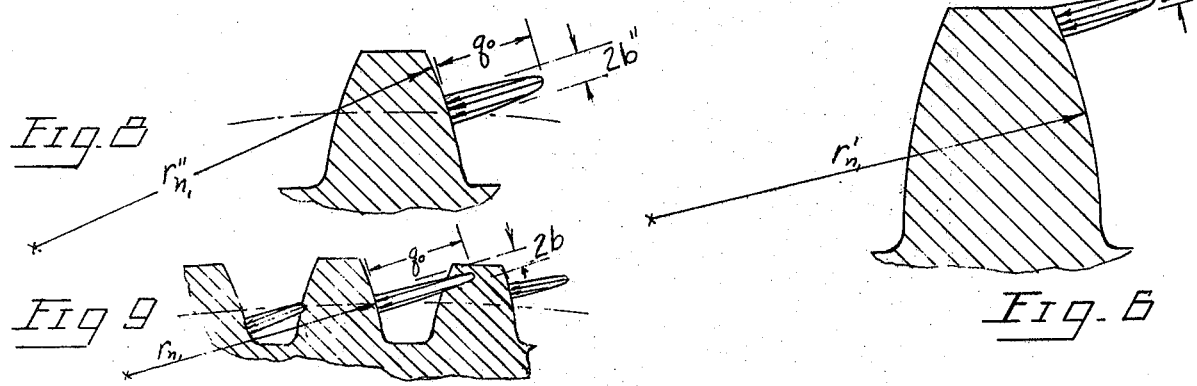

LOW NOISE GEARING

This invention relates to the profile and shape of gear teeth. The gearing herein disclosed is intended for use primarily in applications where it is desired to reduce operating noise to the minimum. It is therefore especially advantageous where pitch line velocities are unusually high. A further advantage is that it significantly reduces friction and heating. The system is also unique in that it achieves these advantages without the drastic loss of torque and power capacity normally associated with the use of fine teeth.

Although gear noise can frequently be reduced somewhat by resourceful design of the gear mountings and housing so as to minimize sound transmission and sound radiation, there is a limit to what can be accomplished in this way. To make really major reductions in noise it is necessary to deal with the problem at its source, namely, noise excitation in the gear teeth.

Noise generation in meshing teeth is influenced by many factors: pitch line velocity; tooth load; tooth manufacturing and alignment errors; pitch; helix angle; pressure angle; elastic modulus, damping coefficient, and density of the tooth material; tooth profile shape; and lubricant. Heretofore gear designers have relied almost exclusively on improvement of tooth manufacturing accuracy in order to reduce noise. This is because in conventional gearing the only other variables from the above list that the designer might attempt to manipulate do little to reduce noise. For example, reduction of the pitch in conventional gears reduces the torque capacity almost in direct porportion. To regain the capacity lost by reducing the pitch requires an increase in gear radius, but this automatically increases the pitch line velocity, which in turn increases the noise.

On the other hand, reducing noise by improvements in the accuracy of manufacture is expensive: hobbed and shaved gears are more costly than hobbed gears, and ground gears are considerably more expensive than either. Furthermore there is a definite limit to the amount of reduction in noise obtainable by improvements in manufacturing accuracy. Changing the accuracy from an ordinary commercial class of cut to the most accurate finish obtainable would reduce the sound pressure level by 6 or 8 decibels at best, and in many large or high speed installations this may not be nearly as much reduction in noise as is desirable.

The object of the invention is therefore the provision of a new tooth form that will reduce the operating noise level of a set of gears many fold as compared to conventional involute teeth.

A further object is to accomplish this noise reduction by means of teeth that will have as high a torque capacity as conventional large involute teeth, as well as operating more efficiently and with less heat generation, and that can be manufactured at no increase in cost by conventional generative tooth cutting or other tooth forming operations.

The means to achieve these and other objects and advantages of the invention will be evident from the drawings as explained in the specification that follows.

FIG. 1 is an enlarged partial section of a pair of mating gears taken perpendicularly to the pitch line and showing mating tooth profiles embodying the invention.

FIG. 2 is a semischematic view of the contact zone taken perpendicularly to the plane of action and showing the multiplicity of elliptical contact areas formed between mating teeth embodying the invention.

FIG. 3 is an analogous view of the contact zone of a typical set of conventional involute gears, showing the trapezoidal or parallelogram contact areas.

FIG. 4 is a partial section through the rim of a gear embodying the invention, taken normal to the helix direction and again showing a typical elliptical contact area.

FIG. 5 is an analogous view through the rim of a conventional involute gear, showing the characteristic trapezoidal or parallelogram contact area.

FIG. 6 is an enlarged normal section through FIG. 5 on the line 6—6, showing also a section through the pressure volume, for a conventional involute tooth.

FIG. 7 is a graph showing the relation between torque (or horsepower) capacity and number of teeth $n_1$ on the smaller gear, for a particular gear ratio and pressure angle, for conventional involute and low noise gears.

FIG. 8 is an enlarged normal section through a gear such as shown in FIG. 4 but for which the radius of the circular arc profiles is the same as that of an involute tooth at the pitch point.

FIG. 9 is an enlarged normal section in a plane represented by lines 9—9 of FIG. 4.

In detail and referring to FIG. 1, typical teeth 11, 13 embodying the invention are shown in transverse section engaged at pitch point P. Tooth 11 is on the smaller gear 12 (pinion) and has a circular arc profile of radius $r_1$, centered at $T_1$; tooth 13 is on the larger gear 14 and has a circular arc profile of radius $r_2$ centered at $T_2$. The line $Q_1 Q_2$ is the pressure line making an angle $\phi$, called the transverse pressure angle, with the common plane 15—15' tangent to the pitch circles 16 and 17. The points $Q_1$ and $Q_2$ are the points where the pressure line $Q_1Q_2$ is tangent to the base circles (not shown) from which involute profiles would have been generated. (Other parts of the two gears 12 and 14, such as hubs, webs, rims, keyways, etc. are standard and are omitted in the interest of clarity).

The tooth profile radius $r_1$ of the smaller gear 12 is generally different from that of an involute profile at the pitch circle, the relative lengths being expressed by the ratio:

$$\frac{r_1}{PQ_1} = K_1 \qquad (1)$$

Similarly, for the larger gear 14, $$\frac{r_2}{PQ_2} = K_2 \qquad (2)$$

The relative radius of curvature $r$ of the mating profiles is:

$$r = \frac{1}{\frac{1}{r_1} + \frac{1}{r_2}} = R_1 \left(\frac{G}{1+G}\right) K \sin\phi \qquad (3)$$

where $R_1$ is the pitch line radius of the smaller gear 12 and $K$ (which is called the "profile radius coefficient") has the value $$K = \frac{K_1 K_2 (1+G)}{K_1 + GK_2} \quad (4)$$

and $G$ is the gear ratio:

$$G = \frac{R_2}{R_1} \quad (5)$$

In these expressions and all subsequent ones, the subscript 1 refers to the smaller gear and 2 the larger gear. In the case of internal gears, $G$ will be negative. A negative value of $K_1$ or $K_2$ indicates the associated profile is concave. It will be evident from equations 1 and 2 that if one of the profiles is an involute curve, the value $K_1$ or $K_2$ for that profile will be unity. The subscript $n$ refers to lengths or angles measured in the normal plane, that is, planes perpendicular to the helix direction.

Further with regard to FIG. 1, it should be noted that in this type of gearing the line of action $cc'$ makes an angle $\alpha$ with the common tangent plane 15, and that this angle is smaller than the pressure angle $\phi$. As a result, the points c, c', where the line of action intersects the addendum circles 18, 19 of the mating gears 12, 14 respectively, are well outside the points where the pressure line $Q_1 Q_2$ intersects these circles. This makes the path of action, arc of action and transverse contact ratio all larger than the corresponding quantities for an involute gear. The magnitude of $\alpha$ can be found from the equation:

$$\sin\alpha = \frac{K \sin\phi \cos\phi}{\sqrt{1 - K(2-K)\sin^2\phi}} \quad (6)$$

For the case where $K_1 = K$, $\alpha$ will equal $\alpha_1$, which may be found by connecting $T_1$ to the center of the smaller gear (not shown). This also shows geometrically why the transverse contact ratio increases almost directly as $K$, and hence $\alpha$, are reduced: As the gears are rotated, the arc centers $T_1$ and $T_2$ are constrained to move in directions perpendicular to the lines joining them to the centers of their respective gears 12, 14 and it is the direction of movement of these points that governs how small the angle $\alpha$ is, which in turn governs how long the path of action $cc'$ is. (The sense of the angle $\alpha$ in FIG. 1 assumes that the pinion 12 is driving).

FIG. 2, showing the zone of contact in the direction 2—2 on FIG. 1, reveals the reason the gearing herein disclosed operates with only a fraction of the noise generated by conventional gearing of the same accuracy of manufacture. In this typical contact zone, which has a width 21–22 equal to the face width F of the gears 12, 14, and a length equal to the path of contact $cc'$, it will be noted that nine successive teeth are in contact at the same time. Further, the contact areas between mating teeth are long, narrow ellipses 24 (shown shadded). As the gears turn, these ellipses translate axially with their centers always on the pitch line P'P''. The ellipses enter or leave the contact zone at opposite corners 21, 23 of the contact zone. Further, the portion of the ellipse that strikes these areas is the narrow attenuated end. Between this effect and the division of the load into so many discrete contact areas, the amount of incremental tooth load that is applied to the teeth during any small increment of gear rotation is only a small fraction of that of conventional gears.

In this figure the number of contact areas that intersect the pitch line P'P'' is usually called the "axial contact ratio," and the number that intersect the path of action $cc'$ is called the "transverse contact ratio." The sum of these two contact ratio may be thought of as the "true contact ratio." From FIG. 2 it may also be seen to be the number of contact areas that intersect the diagonal line 21–23.

In order to put this into perspective, the contact zone of a typical conventional involute gear is shown in FIG. 3. In this figure the face width F is the same as in FIG. 2 and is equal to the distance 31–32. The helix angle is the same, but the length of the path of action 32–33 is greater because the teeth are coarser (for reasons which will be explained below). As in the case of FIG. 2, the true contact ratio is the number of teeth which intersect a diagonal line 31–33 across the contact zone. For the proportions of FIG. 3, the true contact ratio, which as indicated is the number of teeth in simultaneous contact, will be seen to be three in the position shown, dropping to two for part of the action. It should also be noted that for a given contact zone, the helix angle that will produce the maximum number of contact areas will be the one that makes the lengthwise direction of the contact areas perpendicular to line 21–23 of FIG. 2, (or line 31–33 of FIG. 3, as the case may be). However, if these contact areas make an angle of 60° or more with these lines, the number of contact areas will be close to the optimum.

In the case of the conventional involute teeth shown in FIG. 3, the contact areas are parallelograms 34 or trapezoids 35, 36, the ends of which are not attenuated and the amount of incremental tooth load imposed on the teeth for a given small increment of gear rotation is considerable. This is what makes this type of gearing comparatively noisy.

Sections taken in the 4–4 direction in FIG. 2 and the 5—5 direction in FIG. 3 are shown in FIGS. 4 and 5 respectively. These figures show in elevation the typical contact areas 24 and 34 for low noise and conventional involute gears respectively. It should be noted in connection with these figures that whereas the lengths of the contact areas 34, 35, 36 of an involute gear are not affected by the load (only the width is), in the case of the elliptical contact areas 24 of gears embodying the subject invention, both the length and the width of the ellipse varies with the load imposed on the teeth. If low noise gearing is to be properly proportioned, the major axis of the ellipse must therefore occupy the full height of the tooth, as shown in FIGS. 2 and 4, when the gear is subjected to the full allowable torque. If the ellipse is too small (or the tooth too large), there will be a portion of the tooth that is wasted because it is never contacted by any part of the mating teeth, and this will result in an unnecessarily coarse pitch, and a loss of contact ratio and torque capacity. On the other hand, if the ellipse is too large to fit properly onto the tooth, there will be increased noise, possible tooth breakage, and accurate calculation of the torque capacity will be impossible.

FIG. 6 shows a typical involute tooth in normal section and the loading for which it must be designed. Because the contact area 34 is a band of uniform width as shown in FIG. 5, the severest bending stress induced in the tooth root occurs when the contact area is at the tip of the tooth as shown in FIG. 6. The magnitude of this stress depends on the tooth load and the tooth proportions, the latter being expressed by what is called the Lewis Form Factor, Y. The general expression for bending stress $s_b$ is called the "Lewis Equation" and takes the form:

$$s_b = \frac{P_{d_n} W_n}{FY} \quad (7)$$

where $p_{d_n}$ is the normal diametral pitch and $W_n$ is the normal tooth load per unit length in the tangential direction. This equation clearly reveals why conventional involute teeth must be quite coarse in order to transmit appreciable torque: For a given bending stress $s_b$, the larger the diametral pitch $p_{d_n}$ is, the smaller the load $W_n$ must be. (There will be a slight change in the Form Factor Y with changes in pitch, but it is not nearly sufficient to offset the effect of the changes in the pitch itself).

This effect is shown graphically in FIG. 7 in the curve 70—70', which plots torque or horsepower capacity as a function of number of teeth on the pinion. For any given gear ratio, gear diameter and pressure angle, a curve such as this can be drawn. It demonstrates the rapidity with which the torque capacity drops off with increasing tooth numbers as a result of decreased bending strength.

FIG. 6 also shows a section through what is called the "pressure volume," which in the case of an involute gear has a substantially constant width $2b'$ and a maximum height $q_o$. The latter is the surface compressive stress, or "Hertz stress," "contact stress," or "surface endurance limit". For a given maximum surface stress $q_o$, the magnitude of the pressure volume varies as the width of the contact band $2b'$. This in turn depends on the relative radius of profile curvature, which is a function only of gear size, pressure angle and gear ratio. It is completely independent of tooth size (diametral pitch), except insofar as large diametral pitches lead to a large number of teeth and a slightly increased transverse contact ratio. The effect of this increasing contact ratio is to divide the load over more teeth and consequently to increase the torque or horsepower capacity by a small amount. This effect is shown in FIG. 7, in the curve 71—71'. (In this figure i—i' is the interference line).

It will be noted that the surface strength curve 71—71' intersects the bending strength curve 70—70' at point 72. This intersection point 72 defines the critical number of teeth $n'_{cr}$, which is the number of teeth on the pinion that will make the gears equally strong in bending and surface strength. As FIG. 7 indicates, the critical number of teeth is typically between 25 and 50 for conventional involute gears, and it defines the gear that for a given size, material, pressure angle and gear ratio, will have the highest torque capacity. In other words, the two-part curve 71-72-70' defines the upper limit of torque which may be imposed on pinions having various numbers of teeth $n_1$, and by its cusp indicates the number of teeth $n'_{cr}$ that will optimize torque capacity.

FIG. 8 discloses in a normal tooth section the effect of introducing two of the structural features that characterize the present invention: (1) the profile curve is a circular arc instead of an involute spiral, but with a radius $r''_{n_1}$, that is the same as that of the involute $r'_{n_1}$ (FIG. 6); and (2), the tooth is smaller than that of FIG. 6. The effect of (1) is to change the uniform-width contact area characteristic of involute teeth into an ellipse similar to that shown in FIGS. 2 and 4, (albeit slightly fatter at the center). What this does is to change the location of the critical load from the tip of the tooth, as shown in FIG. 6, to the pitch line. This results from the fact that the attenuation of the ellipsoidal pressure volume at the ends of the major axis greatly relieves the load on the tooth tip. (It can be shown, for example, that the volume of the outer one-fourth of an ellipsoid is only 11% of the total volume, and the ratio for an ellipsoidal pressure volume will be the same).

The most important effect that is achieved by using a circular arc profile to shift the location of the critical load from the tooth tip down to the pitch circle is to cut in half the moment arm for the couple that produces the bending stresses. It will be evident from the Lewis Equation (Eq. 7) that this will allow the size of the teeth to be approximately halved. This is shown in FIG. 7, where the 70—70' curve is shifted up to the position 73'—73'. This produces a new intersection point 74 with the surface stress curve 71—71', and gives rise to an increased critical number of teeth $n''_{cr}$. The torque capacity also increases slightly, from T' to T''.

It should be noted that there are two kinds of modifications to involute profiles that may be compared to this kind of full-radius circular arc configuration. Neither of them, however, contributes to reducing tooth size. One of these modifications is quite common in the gearing industry, and comprises what is called "tip-relief". In some cases it is combined with root relief. In this modification the profile is flared back slightly from the theoretically correct involute profile, for up to 30% of the working depth; or in the case of finer pitch gears, the relief may be in the form of a replacement of the entire involute profile by a circular arc of about the same radius, essentially as shown in FIG. 8. Both types of involute profile relief would permit a reduction in tooth size for the reasons indicated above, but as the objective of such relief is to correct the profile so as to accommodate tooth load deflection and manufacturing errors in profile geometry, the possibilities for reducing tooth size are not exploited. In any case, these profile modifications are not of the correct magnitude to achieve the objectives of the present invention, as will be explained below. (c.f., W.O. Davis, "Gears for Small Mechanisms," 2nd Ed. 1970, NAG Press, Ltd., London, England; pgs. 79, 80 and Appendix 1).

There is another kind of modification of the involute profile that occurs by accident rather than design. It comes about from tooth surface wear, as a result of the fact that involute teeth operate in pure rolling at the pitch point, but exhibit considerable sliding when the engaging surfaces are in contact on either side of the pitch line. As a result of this, less wear occurs at the pitch line than elsewhere on the profiles, and the original involute curve gradually laps itself into a circular arc. At the same time the uniform-width contact area 34 such as illustrated in FIG. 3 changes gradually into an ellipse of the same length but slightly wider mid section. Since the volume of a semi-ellipsoid is only two-thirds of that of an elliptic cylinder, this metamorphosis of the contact area is accompanied by an increase in the maximum surface stress at the center of the ellipsoidal pressure volume. This change in load distribution due to wear of initially involute gear teeth is testified to by several phenomena: (1) Surface deterioration usually initiates at the pitch line, indicating there must be a stress peak at that point. (This kind of failure was formerly thought to be due to a breakdown of elastohydrodynamic lubrication as a result of lack of sliding at the pitch point. Application of squeeze-film theory shows that no such breakdown can occur, even in relatively slow speed gear sets). (2) Involute gears must be designed for a surface stress that is 20 to 25% lower than would be predicted on the basis of Hencky-Von Mises Failure Theory applied to Hertzian contact stresses. The theoretical increase in surface stress that occurs when the initial uniform contact band laps into an elliptical contact area is 22% (3) Involute gears become quieter after they are "run in" (i.e., have acquired an elliptical contact area).

The disadvantage of this self-lapping process that takes place with all involute gears is that the unstable load-distribution area requires that the teeth be about twice as coarse as they would otherwise need to be, since they must be large enough to carry the full bending load that occurs when the new profiles are involutes and the tooth tips are heavily loaded as shown in FIG. 5.

Teeth formed to embody the characteristics of the present invention avoid this problem. A pair of successive teeth of this type are shown in FIG. 9 in normal section in the direction 9—9 of FIG. 4. In these teeth the critical load is substantially at the pitch circle, as in FIG. 8, but in addition, the profile radius $r_{n_1}$ is made considerably shorter than that of an involute tooth. According to the Hertz equations, the minor semi-axis of the contact ellipse decreases linearly with the relative radius of curvature. For long narrow ellipses its value is given to a good approximation by the equation:

$$b = 2J_o r_{n_1} \quad (8)$$

where $$J_o = (1-\nu^2) q_o \left(\frac{1}{E_1} + \frac{1}{E_2}\right) \left(\frac{G}{1+G}\right) \quad (9)$$

in which $\nu$ is Poisson's ratio, $q_o$ is maximum surface stress, and $E$ is Young's Modulus. Since the magnitude of the semi-elliptical pressure volume section is a product function of $q_o$ and $b$, it will be evident that shortening the profile radius $r_{n_1}$ relieves the tooth load in direct proportion as $b$ is reduced, and this in turn reduces the bending stress. Consequently even without decreasing $q_o$ it becomes possible to greatly reduce the size of the teeth without exceeding the allowable bending stress, and also without loss of torque capacity since it has been shown in conjunction with FIG. 1 that the contact ratio is increased substantially in direct proportion as the relative radius of curvature $r$ (or $r_n$) is decreased. This is the important novel conception on which the invention is based; namely, the recognition that fine gear teeth, which are inherently quiet gear teeth, need not lead to a low torque capacity simply because the Lewis Equation (Eq.7) indicates the bending stresses go up almost in direct proportion to the diametral pitch. By the means disclosed in this specification, this reduction of torque capacity as the teeth become increasingly fine is completely avoided.

The effect of the herein proposed tooth form on the torque capacity T and critical number of teeth $n_{cr}$ is shown in FIG. 7. Reducing the profile radius coefficient K reduces the profile radii and hence also the width of the pressure volume $b$, which therefore reduces the bending movement applied to the tooth. This reduces the bending stress, so that the bending strength for a given number of teeth (curve 73—73', FIG. 7) is shifted upward, to the position 76—76'. The surface strength curve is affected only slightly, rising to the position 75—75', and the intersection of the bending and surface strength curves is moved upward and to the right, to point 77. This point indicates that gears conforming to the present disclosure will have the highest possible value of $n_{cr}$, and will in addition have a slightly higher torque capacity than conventional gearing.

Theoretically it would seem the curve 76—76' could be shifted as high as desired, and the critical number of teeth $n_{cr}$ would increase accordingly. This is not in fact the case, because the tooth curvature must be such that the contact ellipses (24 in FIGS. 2 and 4) just fill the tooth height. This puts an additional requirement on the radius of curvature, so that there is a unique value of K, herein called the "critical profile radius coefficient," that will cause the bending and surface stresses to be equally critical (i.e., the driving gear has the critical number of teeth $n_{cr}$), and at the same time the contact ellipses will exactly fit the tooth height when the gear is fully loaded. This is the preferred form of the invention and is realized when the value of K, as defined by equations 1, 2 and 4, satisfies the relation $$[K_{cr}(1-K_{cr})]^{0.64} = \frac{0.61 C_a(1+1.4\tan\phi_n)\sin\alpha_{cr}}{\sin^{1.28}\phi\cos\phi_n\sin^{0.28}\psi} \quad (10)$$

In this equation $\phi_n$ is the normal pressure angle, which is related to $\phi$ by the cosine of the helix angle $\psi$:

$$\tan \phi_n = \tan \phi \cos \psi \quad (11)$$

The term $C_a$ in equation 10 is a form factor that depends on the normal pressure angle, the tooth root radius and the expected mode of failure. For teeth of ductile material such as steel or plastic, having a pressure angle greater than 25° and a root stress concentration factor K of 1.2, the value is obtained from the equation:

$$C_a = \frac{\cos^2\phi_n(1+1.4\tan\phi_n)}{K_r(4.2+1.5\sin\phi_n-2\tan\phi_n+1.4\tan^2\phi_n)} \quad (12)$$

When the pressure angle is less than 25°, the governing equation becomes:

$$C_a = \frac{0.67\cos^2\phi_n(1+1.4\tan\phi_n)}{K_r(4.2+1.5\sin\phi_n-4\tan\phi_n-1.4\tan^2\phi_n)} \quad (13)$$

For cast iron teeth having a pressure angle less than 35°

$$C_a = \frac{0.4\cos\phi_n(1+1.4\tan\phi_n)}{K_r(4.2+1.5\sin\phi_n-4\tan\phi_n-1.4\tan\phi_n^2)} \quad (14)$$

When the value of $K_{cr}$ has been found that satisfies equation 10, it may be used to find the critical number of teeth $n_{cr}$ from the equation:

$$n_{cr} = \frac{0.55 C_a(1+1.4\tan\phi_n)\cos\psi}{J_{0cr} K_{cr} \sin\phi\cos\phi_n} \quad (15)$$

Lastly, the torque capacity can be found from the equation:

$$T_1 = 1.2 \, FR_1^2 \, q_{0_{cr}} \, J_{0_{cr}} \, \cos\psi \, \sqrt{1-K_{cr}(2-K_{cr})\sin^2\phi} \quad (16)$$

Solutions to the above equations reveal that the optimum normal pressure angles for obtaining a high value of $n_{cr}$ are in the range 30° to 35°, whereas those giving the greatest torque capacity are 14½° and 20°. (In general, the subscript "cr" as used in this specification indicates that the symbol to which it is appended has a particular magnitude unique to the case where the driving gear has the critical number of teeth $n_{cr}$.)

It should be noted that to obtain a value for $J_{0_{cr}}$ to substitute into equation 15, the maximum surface stress $q_{0_{cr}}$ should be the surface stress that produces incipient subsurface failure according to the Hencky-VonMises Distortion Energy Theory as applied to Hertz stresses. According to this theory, structural damage first occurs at a depth beneath the tooth surface equal to about three-fourths of the minor semi-axis of the contact ellipse. This Distortion Energy stress, which is also called the "effective" stress, is the most reliable stress to consider in predicting failure by yielding or fatigue crack propagation for elements subjected to bi- or tri-axial loading. In this specification it is the basis of the equations derived to determine allowable bending stress as well as allowable surface stress. The effective stress is calculated from the equation $$S_{eff} = \sqrt{S_1^2 + S_2^2 - S_1 S_2 - S_2 S_3 - S_1 S_3} \quad (17)$$

where $S_1$, $S_2$ and $S_3$ are the principal stresses. In the case of Hertz stresses for a long narrow elliptical contact area, the effective stress is approximately $$S_{eff} = 0.55 \, q_o \quad (18)$$

For the two types of stress that are imposed on gear teeth (root stresses and surface stresses), structural damage from bi- or tri-axial loading occurs when the effective stress reaches some value, herein referred to as the "critical stress" $S_{cr}$, equal to whichever is the smaller between the yield point stress and the endurance limit in cyclical loading from zero to the effective stress. (It is presumed that these stresses will be of the same nature, i.e., compressive or tensile, as those of the element being considered. The endurance limit referred to may be obtained analytically from published data on endurance limits in reverse bending with the aid of a Soderberg or Goodman diagram, or empirically by a rotating beam test with combined cantilever and direct load.)

On the foregoing basis the value of $q_{0cr}$ to be used in equation 9 for finding $J_{0cr}$ is thus $$q_{0cr} = \frac{S_{cr}}{0.55} = 1.8 \, s_{cr} \quad (19)$$

As disclosed to this point the preferred form of the invention has specified tooth profile proportions that enable a balance to be maintained between bending and surface stresses. This balance, however, while it affords the most economical configuration, is not always achievable. As equation 9 indicates, the factor $J_o$ varies linearly with the maximum surface stress $q_o$. When this stress is small, $J_o$ will be small and the critical number of teeth $n_{cr}$ (equation 15) will be correspondingly large. That is to say, the teeth can be extremely fine and the noise level will be very low.

However, examination of equation 16 reveals that the torque capacity depends on both $q_o$ and $J_o$, so that it varies with the square of the maximum surface stress $q_o$. Consequently if the gears are made of a material that has a low allowable surface stress in order to obtain a high value of $n_{cr}$, the torque capacity as given by equation 16 may be inadequate. In this situation, (which is not an uncommon one when the gear materials are heat-treated steel), a choice must be made between increasing F and/or $R_1$ or relinquishing the balance between bending and surface stresses. In terms of the graph of FIG. 7, the latter choice causes the design point to move down and to the right along the curve from point 77 in the direction of 76'. The torque capacity will be reduced, but may still be slightly higher than that of a coarse-tooth involute set for which the design point is 72, and a great deal higher than a fine tooth involute gear for which the design point is on the curve 72-70'.

For design points on the curve 77-76' only one condition must be met instead of two. As before, the profile radius coefficient K must be reduced in order to limit the bending stress, but the surface stress will not have reached the critical surface stress $q_{0cr}$ at the time the peak torque expands the contact ellipses to the point where they occupy the full tooth height (FIG. 4). However, the need to satisfy only this one condition does not make the calculations simpler. Several approaches are possible, one of which is to obtain $K_{cr}$ and $n_{cr}$ from equations 18, 9, 12 (or 13 or 14), 10, and 15. These values are then used in the following equation:

$$\frac{0.9(1-K)^{0.64}[1-K(2-K)\sin^2\phi]^{0.5}\sin^{0.28}\psi\cos\psi}{K^{0.86}\sin^{0.72}\phi\cos\phi} = J_{0cr} \sqrt{n_1 n_{cr} K_{cr}} \quad (20)$$

where $n_1$ is the number of teeth on the pinion. The value of $K$ obtained from solving this equation is then used in the equation $$Q_0 = Q_{0cr} \sqrt{\frac{n_{cr} K_{cr}}{n_1 K}} \quad (21)$$

to find the reduced maximum surface stress, and this in turn is used in equation 9 and the following equation to find the maximum torque: $T_1 = 1.2 \, FR_1^2 q_o J_o \cos\psi \sqrt{1-K(2-K)\sin^2\phi}$ (22)

It may be noted that equations 10 and 20 are both developed from a common equation stipulating the tooth proportions that insure the contact ellipses will exactly fit the tooth height. This condition will be met when the ratio of contact ellipse height to tooth height, herein called the "tooth utilization ratio" $v$, is substantially equal to unity. (In the gearing herein disclosed, the contact ellipses are many times as long as they are wide, so that the contact ellipse height is measured by the difference in radial distance from the pinion or gear axis to the ends of the major axis of the ellipses.)

The tooth utilization ratio may be calculated to a good degree of approximation from the following equation:

$$v = \frac{1.11 n_0 J_0 K^{0.36} \sin\alpha}{(1-K)^{0.64} \sin^{0.28}\phi \sin^{0.28}\psi \cos\psi} \quad (23)$$

It should also be noted that as gear teeth get finer, tolerances become more critical. To obtain modest increases in torque capacity as compared to coarse-tooth involute gearing indicated in FIG. 7, gears embodying the subject invention must be fabricated and mounted so that the loss of working depth due to combined center distance and pitch line runout errors, which is called herein "the effective center distance variation", should preferably not exceed 10% of the tooth working depth. Another way of putting this is that it is desirable to use a diametral pitch that is between one-tenth and one-half the reciprocal of the effective center-distance variation.

It should also be noted that while the foregoing analysis has been based on a set of parallel-axis external gears, the method of reducing noise herein disclosed is equally applicable to internal gears, bevel gears, hypoid gears, planetary gears, and others. Further, the various known procedures for promoting improved performance generally, and noise reduction specifically, are as applicable to this gearing system as to any other system. This includes use of unequal addenda and slightly different pressure angles on the driving and driven gears, so as to shift most or all of the tooth action to the recess side of the pitch point; use of one self-aligning gear; use of a resilient sleeve interposed between a metallic toothed rim and the mounting shaft, to intercept sound waves traveling from the teeth to the housing via the shafts; chamfering the leading edge of the teeth down to the pitch line, to minimize contact area impact; and mounting the bearings of one shaft in one or more metal or plastic eccentric sleeves to allow tooth misalignment to be adjusted out.

And lastly it should be noted that the type of gear profiles herein disclosed may be employed on spur or straight bevel gears, and because the teeth are very fine and the contact ratio high, relatively good continuity of action will be obtained. In such gears the teeth are proportioned so that at maximum design torque, contact starts as a narrow line contact when the gear tooth addendum crosses the plane of action. As the gear set continues to rotate, this line contact moves down the tooth toward its root, increasing in width as it approaches the pitch line, then diminishes in width on the recess side, becoming again a narrow line at the tooth root, where contact terminates. To proportion spur gears so as to achieve this result, the same equations may be used as for helical gears. Calculations are simply made using a very small helix angle $\psi$, say 5°, then this helix is omitted in the manufacture. Similarly, straight bevel gears may be designed in the same way, using the proportions for spiral bevel gears with a small spiral angle; in both cases the tooth proportions taken from the basic equations are those for the teeth at the mid point of the face.

In the following claims the term "pitch line" refers to the common line or element in the pitch surfaces of mating gears at the point of tangency of these surfaces; "addendum surface" refers to the surface of revolution containing the tips of the teeth of a gear.

The specific description given above of the preferred form of the invention should not be taken as restrictive as it will be apparent that various modifications in design may be resorted to by those skilled in the art without departing from the scope of the following claims.

I claim:

1. In a pair of mating gears, teeth having a profile radius coefficient of less than unity, a pressure angle of less than 40° in planes perpendicular to the pitch line of said pair, an addendum height greater than 0.5 divided by the diametral pitch, and a tooth utilization ratio of substantially unity.

2. A pair of mating gears according to claim 1 wherein the profile radius coefficient is equal to the critical profile radius coefficient.

3. A pair of mating gears according to claim 1 wherein said teeth are formed to extend across the rims of said gears at an angle with respect to the pitch line of said pair.

4. A pair of mating gears according to claim 2 wherein said teeth are formed to extend across the rims of said gears at an angle with respect to the pitch line of said pair.

5. A pair of mating gears according to claim 1 wherein the profiles of said teeth in planes perpendicular to said pitch line on one of said pair are substantially circular arcs.

6. A pair of mating gears according to claim 2 wherein the profiles of said teeth in planes perpendicular to said pitch line on one of said pair are substantially circular arcs.

7. A pair of mating gears according to claim 3 wherein the profiles of said teeth in planes normal to said teeth on one of said gears are substantially circular arcs.

8. A pair of mating gears according to claim 4 wherein the profiles of said teeth in planes normal to said teeth on one of said gears are substantially circular arcs.

9. A pair of mating gears according to claim 1 wherein the pressure angle at the pitch circle of one of said pair is slightly larger than that of the other of said pair.

10. A pair of mating gears according to claim 2 wherein the pressure angle at the pitch circle of one of said pair is slightly larger than that of the other of said pair.

11. A pair of mating gears according to claim 1 wherein the addendum of one of said pair is longer than the addendum of the other of said pair.

12. A pair of mating gears according to claim 2 wherein the addendum of one of said pair is longer than the addendum of the other of said pair.

13. A pair of mating gears according to claim 1 wherein the diametral pitch is between one-tenth and one-half the reciprocal of the effective center distance variation.

14. A pair of mating gears according to claim 2 wherein the diametral pitch is between one-tenth and one-half the reciprocal of the effective center distance variation.

15. A pair of mating gears according to claim 1 wherein the number of teeth on the smaller of said pair is greater than 50.

16. A pair of mating gears according to claim 2 wherein the number of teeth on the smaller of said pair is greater than 50.

17. A pair of mating gears according to claim 1 wherein the lengthwise direction of said teeth makes an angle of at least 60° with a line connecting opposite corners of the contact zone.

18. A pair of mating gears according to claim 2 wherein the lengthwise direction of said teeth makes an angle of at least 60° with a line connecting opposite corners of the contact zone.

19. A pair of mating gears according to claim 1 wherein the diametral pitch is greater than 30.

20. A pair of mating gears according to claim 2 wherein the diametral pitch is great than 30.

21. A pair of mating gears according to claim 1 wherein the pressure angle in the normal plane is greater than 25°.

22. A pair of mating gears according to claim 2 wherein the pressure angle in the normal plane is greater than 25°.

23. A pair of mating gears according to claim 1 wherein the profile radius coefficient is greater than 0.5.

24. A pair of mating gears according to claim 2 wherein the profile radius coefficient is greater than 0.5.

25. A pair of mating gears according to claim 1 wherein the profile radius coefficient is less than 0.9.

26. A pair of mating gears according to claim 2 wherein the profile radius coefficient is less than 0.9.

* * * * *

UNITED STATES PATENT OFFICE
CERTIFICATE OF CORRECTION

Patent No. 3,881,364      Dated May 6, 1975

Inventor(s) William S. Rouverol

It is certified that error appears in the above-identified patent and that said Letters Patent are hereby corrected as shown below:

Column 5, equation 7, change $P_{d_n}$ to $p_{d_n}$; change $w_n$ to $W_n$.

Column 9, correct equation 17 to read:

$$S_{eff} = \sqrt{S_1^2 + S_2^2 + S_3^2 - S_1 S_2 - S_2 S_3 - S_1 S_3}$$

Column 9, line 66, change $q_{ocr}$ to $q_{o_{cr}}$ (as in equation 16).

Column 9, line 67, change $J_{ocr}$ to $J_{o_{cr}}$ (as in equation 16).

Column 10, equation 21, change $Q_o$ to $q_o$; change $Q_{o_{cr}}$ to $q_{o_{cr}}$.

Column 10, equation 22, correct to read:

$$T_1 = 1.2 \, FR_1^2 q_o J_o \cos \psi \sqrt{1 - K(2-K) \sin^2 \phi}$$

Column 11, line 4 and equation 23: change v to U.

Signed and Sealed this eighteenth Day of November 1975

[SEAL]

Attest:

RUTH C. MASON
Attesting Officer

C. MARSHALL DANN
Commissioner of Patents and Trademarks